No. 781,687.

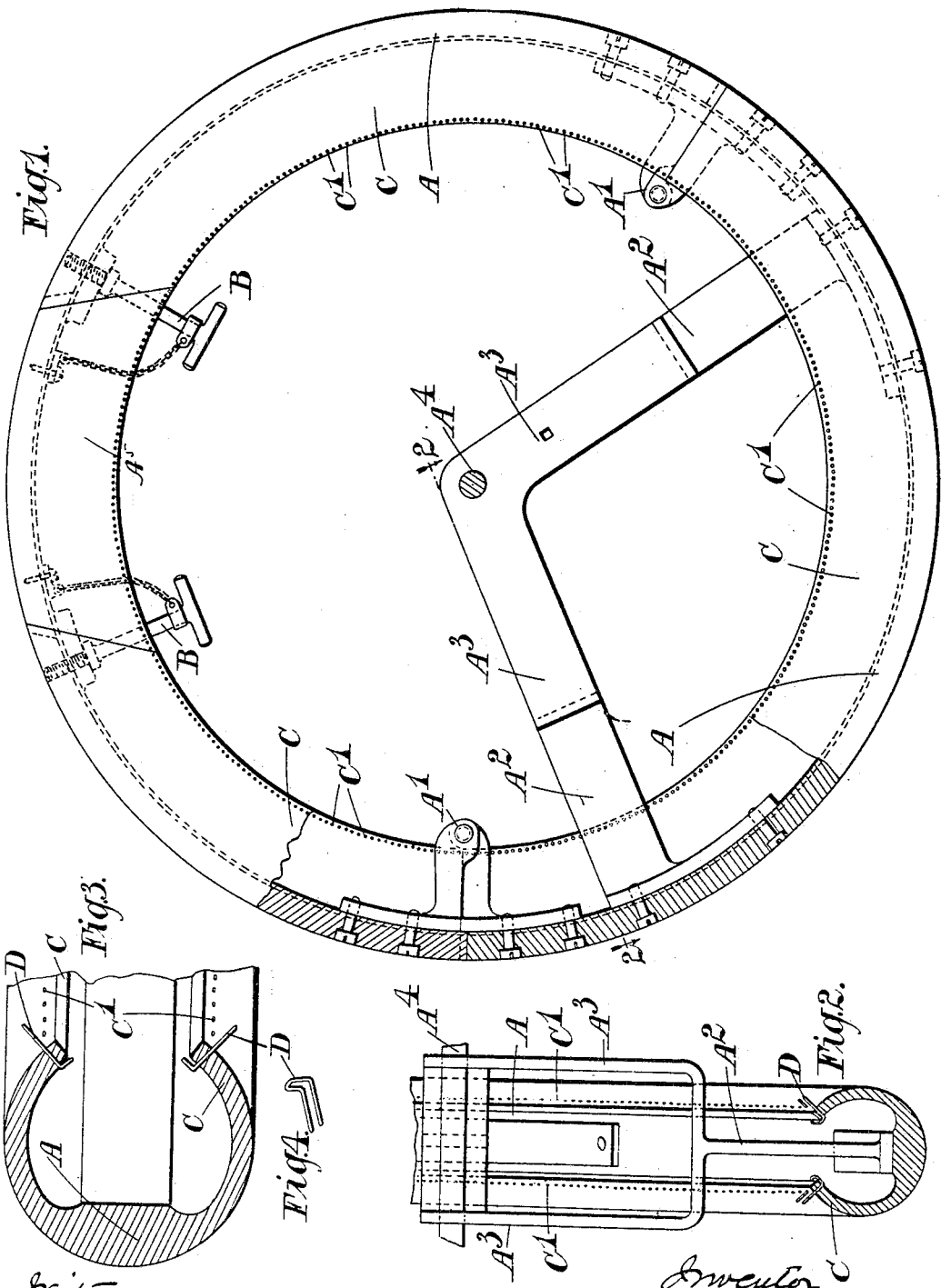

Patented February 7, 1905.

UNITED STATES PATENT OFFICE.

THOMAS SLOPER, OF DEVIZES, ENGLAND, ASSIGNOR TO CHRISTIAN HAMILTON GRAY, OF SILVERTOWN, ESSEX, ENGLAND.

FORMER OR MOLD FOR MAKING PNEUMATIC TIRES OR THE LIKE.

SPECIFICATION forming part of Letters Patent No. 781,687, dated February 7, 1905.

Application filed March 12, 1904. Serial No. 197,868.

*To all whom it may concern:*

Be it known that I, THOMAS SLOPER, a subject of the King of England, residing at Devizes, county of Wilts, England, have invented certain new and useful Improvements in or Relating to Formers or Molds for Making Pneumatic Tires or the Like, of which the following is a specification.

This invention relates to "formers" which may be used for various purposes; but I will describe it as applied to the manufacture of pneumatic tires.

The object of the invention is to facilitate the manufacture of the article upon the former and also its removal therefrom.

In carrying out the invention I provide in a former for a pneumatic tire around the inner periphery of the former a series of pins upon which I wind the cords or threads of which the tire or tire fabric is to be made.

With strong heavy tires, such as are suitable for self-propelled vehicles, considerable difficulty is found in removing the tire when made from the former, notwithstanding that the former is collapsible, To facilitate this, I in my present invention arrange that the pins can be drawn inwardly toward the center of the plane of the former, so that when so drawn in they do not project, and the threads previously wound around them are thus released. Various ways of accomplishing this may be adopted; but a convenient one I find to be to employ a wire staple of suitable proportions and bend the loop portion at a suitable angle to the legs, thus forming a handle by which the staple can be moved. The staples pass through holes in annular flanges projecting inwardly toward the center of the circular former and when pushed outward, so that the handle portion lies against or near the inside of the flange, the outer ends of the wire are projecting and are in position to receive the threads. To release the threads, the staples are drawn inwardly by their handles, thus releasing the threads, as previously explained. In some cases and especially for the manufacture of pneumatic tires where canvas or the like is used it is desirable to have the wires or staples with pointed ends, so that they can be forced through the canvas, &c.

In the accompanying drawings, which illustrate one method of carrying out this invention, Figure 1 is a side elevation of the former. Fig. 2 is a part section of the same on the line 2 2 of Fig. 1. Fig. 3 is a transverse section, on an enlarged scale, through one side of the rim of the former, and Fig. 4 is a perspective view of a staple on the same scale as Fig. 3.

Like letters indicate like parts throughout the drawings.

The former shown in side elevation in Fig. 1 comprises a circular rim or annular support A, built up of sections hinged together at A'. The free ends of the hinged sections are connected by a detachable section $A^3$, held in place by thumb-screws B, which pass through the ends of the sections to be joined and which are scarfed, so that a convenient joint is formed. The annular support A is further provided with inwardly-directed radial arms each consisting of a section $A^2$ and a bifurcated portion $A^3$, which meet at the center of the former. The former can thus be carried and rotated without difficulty upon a spindle $A^4$, passed through an orifice in the bifurcated ends of the arms, so that it is kept steady in a lateral direction. The rim portion A is conveniently hollowed for the sake of lightness, as shown in section, Figs. 2 and 3, so that it takes the form of a tube open on the inner side. The side portions or walls of the tube constitute inwardly-directed flanges C, which are perforated near their inner edges, as at C', to receive staples D. Each staple, one of which is shown in perspective, Fig. 4, is bent at its looped end to a right angle and the staples fit loosely in the perforations, so that they may be slid in one direction or the other. The opposed series of perforations C', one series in each flange, are directed toward the center line of the rim or annular support A, so that when the staples are in place they project radially from the rim, those of one series being thus sloped away from those of the other series. The threads or cords are passed around the pins in any desired manner while building up the tire.

When it is desired to remove the completed tire or completed layer or layers of fabric built on the former, the staples D, which if fixed would prevent removal are withdrawn toward the middle of the former, so that the free ends no longer project beyond the outer faces of the flanges. The screw B can then be loosened and the separate parts of the rim A folded in toward the center, leaving the fabric free. The looped ends of the staples being bent over at a right angle to the legs form handles by which the staples may be moved in one direction or the other, as will be readily understood.

It is preferred to have the exterior of the former curved to suit the shape the interior of the finished tire is intended to take, as shown in the drawings, although this is not essential. The side flanges C may, for instance, be flat and lie parallel one to the other, the peripheral face only of the former being rounded. Where this is the case, however, it will be seen that all the transverse cords of the different layers will be of the same length, so that a greater strain will be put on those of the outer layer than those of the inner layers when the tire is finally curved. This may be rectified to some extent by sloping the staples toward the center of the former, so that the cords of each layer of fabric will be slightly longer than those of the layer beneath it; but the same end is obtained more perfectly by curving the whole outer face of the former and setting the staples radially thereto, as shown.

Obviously pins may be employed instead of staples, and the staples or pins need not necessarily be bent over in the manner described, although this is preferred for convenience. The staples are not necessarily arranged to project from the edges of the former-flanges, but may project from any other part of the former or specially-shaped portions of the same, according to requirements.

Various modifications may be made in this device without departing from the spirit of this invention, which consists mainly in the movable pins or staples, as described.

What I claim as my invention, and desire to secure by Letters Patent, is—

1. In a "former" for tires, the combination with a circular support having a series of perforations, of movable pins carried in these perforations and adapted to project from the face of the support or to be withdrawn so that they do not project, substantially as set forth.

2. In a "former" for tires, the combination with a collapsible annular support having side flanges directed toward the center of the "former" and provided with a series of perforations, of pins carried in these perforations and adapted to project from the outer faces of the flanges or to be withdrawn so that they do not project, substantially as set forth.

3. In a "former" for tires, the combination with a hollow annular support shaped externally to the form the interior of the completed tire is intended to take and having a series of perforations on each side where the edges of the tire are to be formed, such perforations being directed toward the center line of the hollow support as described, of pins adapted to project from the face of the support or to be withdrawn so that they do not project, the inner face of the support being open so that the pins can be operated from the hollow interior, substantially as set forth.

4. In a "former" for tires, the combination with a collapsible annular support of tubular cross-section open on that side toward the center and having a series of perforations near the edge of each flange formed by the opening, of pins carried in these perforations and adapted to project from the outer faces of the flanges or to be withdrawn so that they do not project, substantially as set forth.

5. In a "former" for tires, the combination with an annular support having opposed series of perforations arranged parallel to the central plane of the support, of pins carried in these perforations and adapted to project from the outer face of the support or to be withdrawn so that they do not project, the perforations being so directed that when the pins project those of one series are inclined away from those of the other, substantially as set forth.

6. In a "former" for tires, the combination with an annular support having a series of perforations, of movable staples carried in these perforations, the leg portions being adapted to project from the face of the support or to be withdrawn so that they do not project, substantially as set forth.

7. In a "former" for tires, the combination with an annular support having a series of perforations, of movable staples carried in these perforations, the leg portions being adapted to project from the face of the support or to be withdrawn so that they do not project while the looped end of each staple is bent at approximately right angles to the legs, substantially as set forth.

In testimony whereof I have signed my name to this specification in the presence of two subscribing witnesses.

THOMAS SLOPER.

Witnesses:
FRANCIS W. BARRACLOUGH,
A. M. HAYWARD.